United States Patent
Lu

(10) Patent No.: US 7,097,218 B2
(45) Date of Patent: Aug. 29, 2006

(54) LOCKING DEVICE OF A CASING

(75) Inventor: Ying-Ta Lu, Taipei (TW)

(73) Assignee: First International Computer Inc., Taipei (TW)

( * ) Notice: Subject to any disclaimer, the term of this patent is extended or adjusted under 35 U.S.C. 154(b) by 0 days.

(21) Appl. No.: 10/621,607

(22) Filed: Jul. 18, 2003

(65) Prior Publication Data

US 2005/0011047 A1    Jan. 20, 2005

(51) Int. Cl.
*E05C 19/00* (2006.01)
(52) U.S. Cl. .......... 292/304; 292/341.17; 292/DIG. 11; 292/95; 292/130; 292/132
(58) Field of Classification Search ............... 292/219, 292/220, 228–230, 129, 341.15, 341.17, 292/341.18, DIG. 11, DIG. 12, DIG. 54, 292/254, 130–132, 105–108, 301–304, DIG. 50, 292/95; 312/223.1, 223.2; 361/381, 683, 361/681; 220/263, 264, 322, 324, 326; 24/643, 24/647

See application file for complete search history.

(56) References Cited

U.S. PATENT DOCUMENTS

| | | | | |
|---|---|---|---|---|
| 1,133,254 A | * | 3/1915 | Backus | 292/127 |
| 1,309,310 A | * | 7/1919 | Voight | 292/234 |
| 4,138,151 A | * | 2/1979 | Nakao | 292/76 |
| 5,224,744 A | * | 7/1993 | Michelutti | 292/234 |
| 5,393,110 A | * | 2/1995 | Nakamori et al. | 292/216 |
| 5,465,191 A | * | 11/1995 | Nomura et al. | 361/681 |
| 5,638,839 A | * | 6/1997 | Montoli | 132/295 |
| 6,116,663 A | * | 9/2000 | Robert | 292/153 |
| 6,152,499 A | * | 11/2000 | Robert | 292/153 |
| 6,762,928 B1 | * | 7/2004 | Lo | 361/681 |

* cited by examiner

*Primary Examiner*—Chuck Y. Mah
*Assistant Examiner*—Michael J. Kyle
(74) *Attorney, Agent, or Firm*—Browdy and Neimark, PLLC

(57) ABSTRACT

A locking device applies to a casing having a cover and a seat for opening and closing of the casing. The locking device has a recess formed on an edge of the seat, a buckle downwards protruding from the cover and matching the recess, and a roller parallel-disposed in the recess and pivoted to the seat. The buckle has an arcuate face smoothly against an upper slot of the roller for closing and opening the casing. A direction of lifting of the cover corresponds to a rotation of the roller so that a direction of applied force can be continuously unchanged to achieve an ergonomic effect.

5 Claims, 10 Drawing Sheets

LOCKING DEVICE OF A CASING

BACKGROUND OF THE INVENTION

1. Field of the Invention

The present invention relates to a locking device of a casing. More particularly, the present invention relates to a locking device of a casing applied to an information product such as a notebook, a PDA, a cell phone and the like.

2. Description of Related Art

Referring to FIG. 1, a first prior art-locking device includes buckling matching portions 20a protruding from edges on the same side of a cover 31a and a seat 32a of a casing, respectively, and two movable buckles 10a located relative to the buckling matching portions 20a for the closing and opening the casing.

The first prior art-locking device is operated by first moving the two movable buckles 10a, respectively, in opposite directions and then to lift vertically the cover 31a, such that the case is opened. The direction of the lifting of the cover 31a doesn't correspond to the motion of the movable buckles 10a, and is not ergonomically pleasing. Furthermore, the alignment between the movable buckle 10a and the buckling matching portion 20a often doesn't add to easy use of the prior art-locking device because of slides between the buckling matching portions 20a.

As shown the FIG. 2 and FIG. 2A, a second prior art-locking device includes an upper buckling mechanism 20b disposed on a cover 31b of a casing and a lower buckling mechanism 10b disposed on a seat 32b of the casing and matching the upper buckling mechanism 20b for buckling and locking to each other.

The upper buckling mechanism 20b has an upper hook 21b, while the lower buckling mechanism 10b has a release button 11b and a slot 12b relative to the upper hook 21b. However, complex components and assembly steps are expensive to manufacture. Further, operation of the second prior art-locking device is ergonomically displeasing, involving first inwardly pushing the release button 11b and then vertically lifting the cover 31b to open the casing, such that the direction of the lifting of the cover 31b doesn't correspond to the motion of the release button 11b.

Hence, the examples of prior art mentioned above obviously have disadvantages and an improved locking device is needed.

SUMMARY OF THE INVENTION

A primary object of the present is to provide a locking device in which the cover-lifting direction corresponds to the rotation of the roller so that a direction of applied force is continuously unchanged for improved ergonomics while simultaneously simplifying assembly steps to reduce manufacturing costs.

A locking device according to the present invention is applied in a casing having a cover and a seat for opening and closing thereof. The locking device includes a recess formed on an edge of the seat, a buckle downwards protruding from the cover and matching the recess, and a roller parallel-disposed in the recess and pivoted to the seat. The buckle has an arcuate face that smoothly presses against an upper slot of the roller for the closing and opening of the casing. A direction of applied force is continuously unchanged and thus ergonomic.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

The drawings included herein provide a further understanding of the invention. A brief introduction of the drawings is as follows.

DETAILED DESCRIPTION OF PREFERRED EMBODIMENTS

Figure 1:
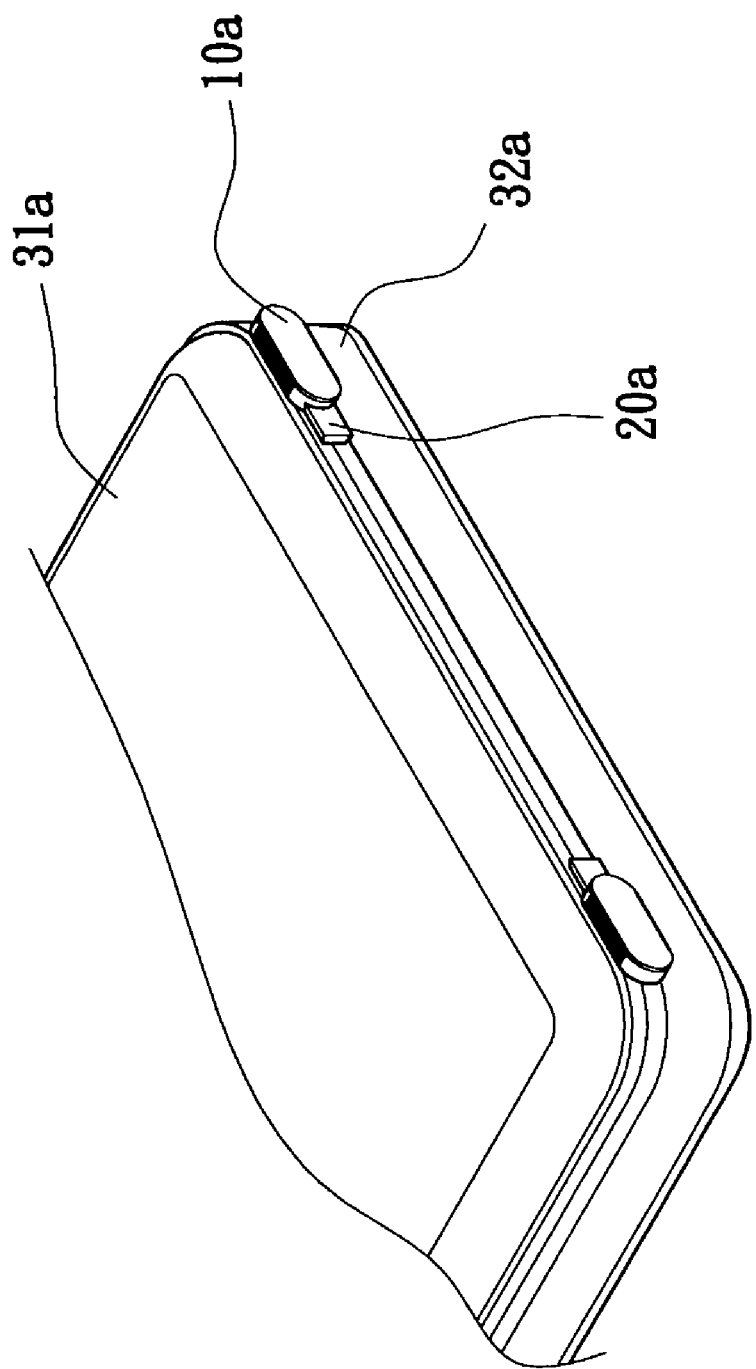
FIG. 1 is a perspective view of a first prior art-locking device.
Figure 2:
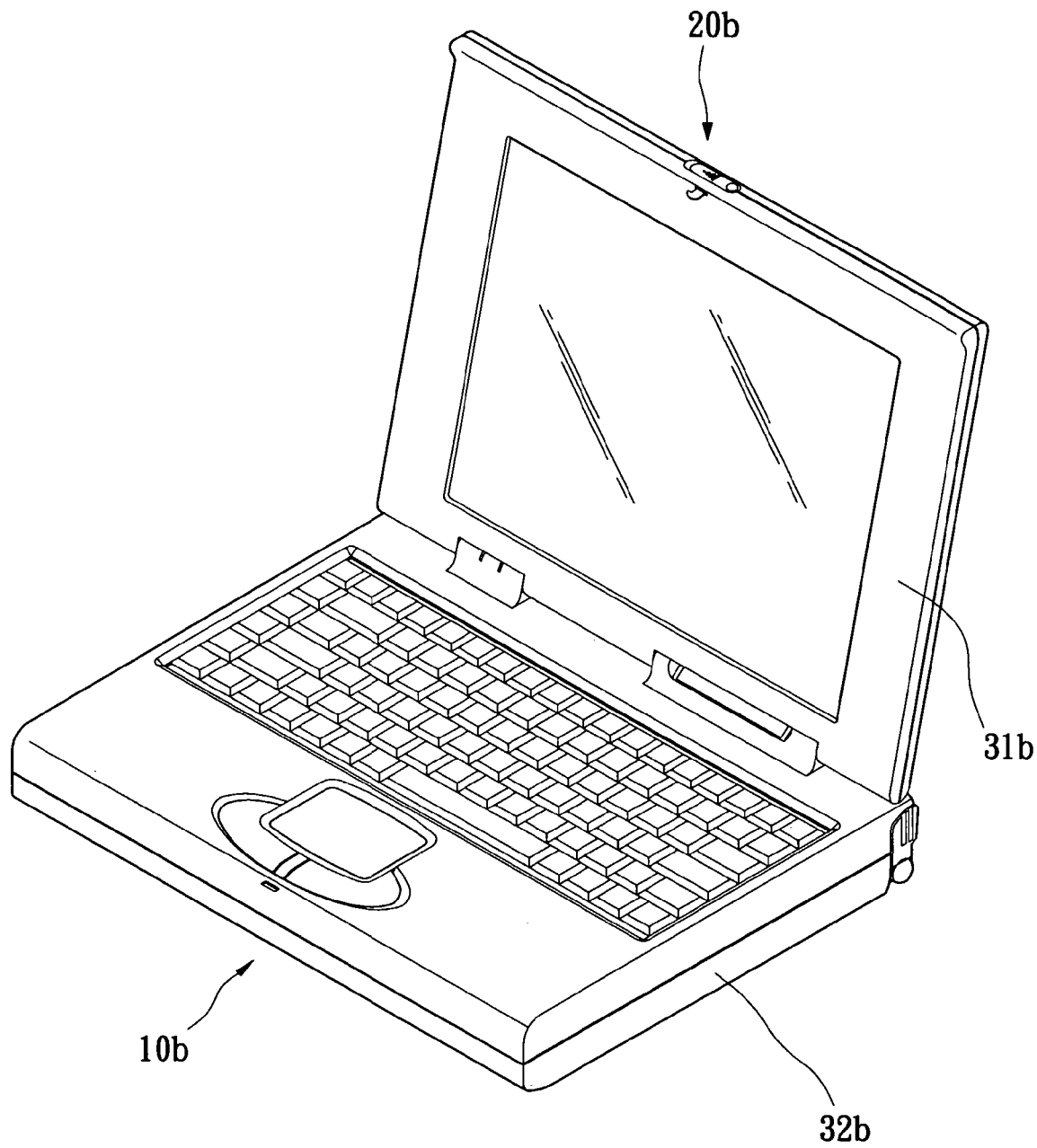
FIG. 2 is a perspective view of a second prior art-locking device.
Figure 2A:
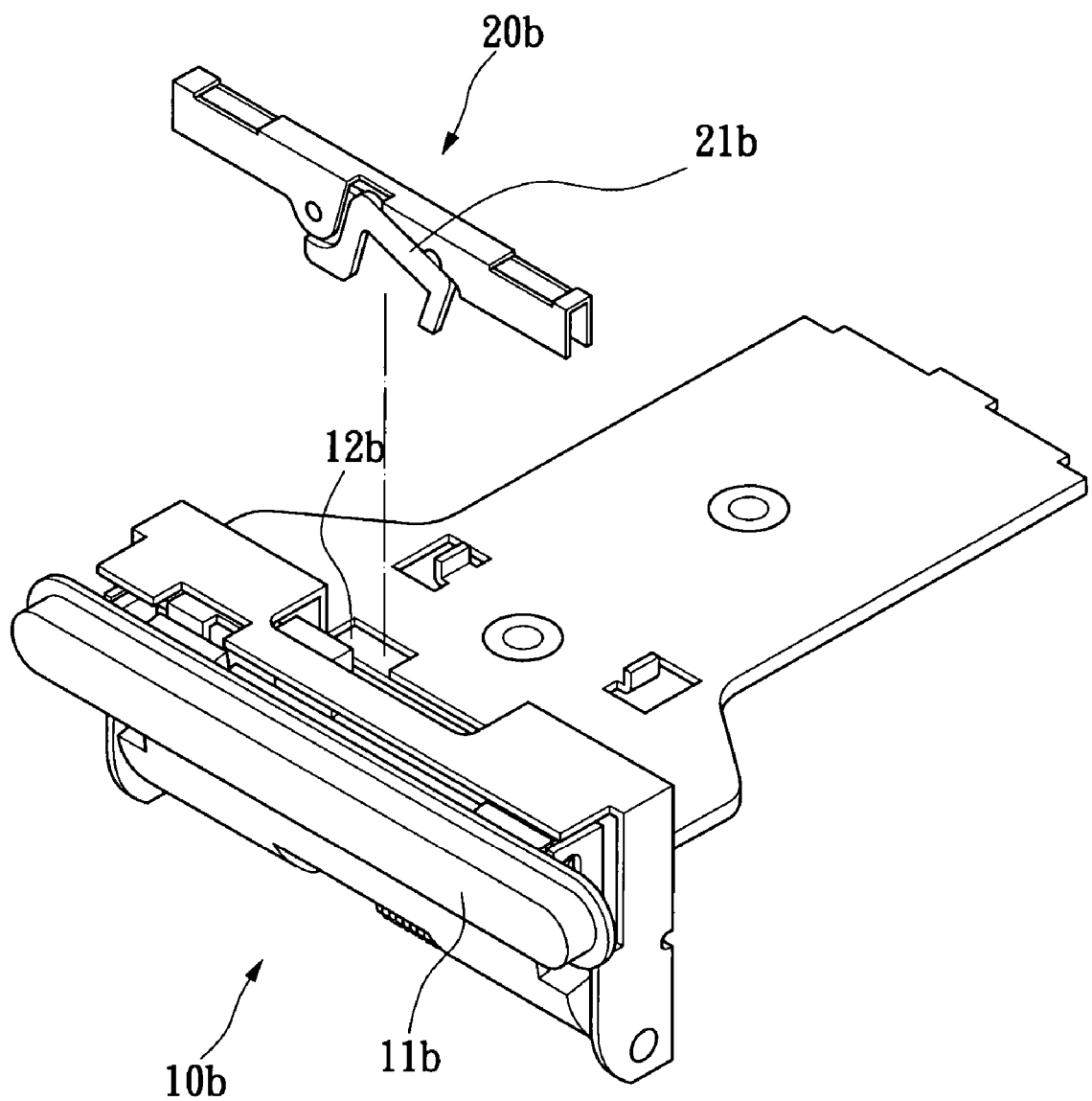
FIG. 2A is an enlarged view of the second prior art-locking device.
Figure 3:
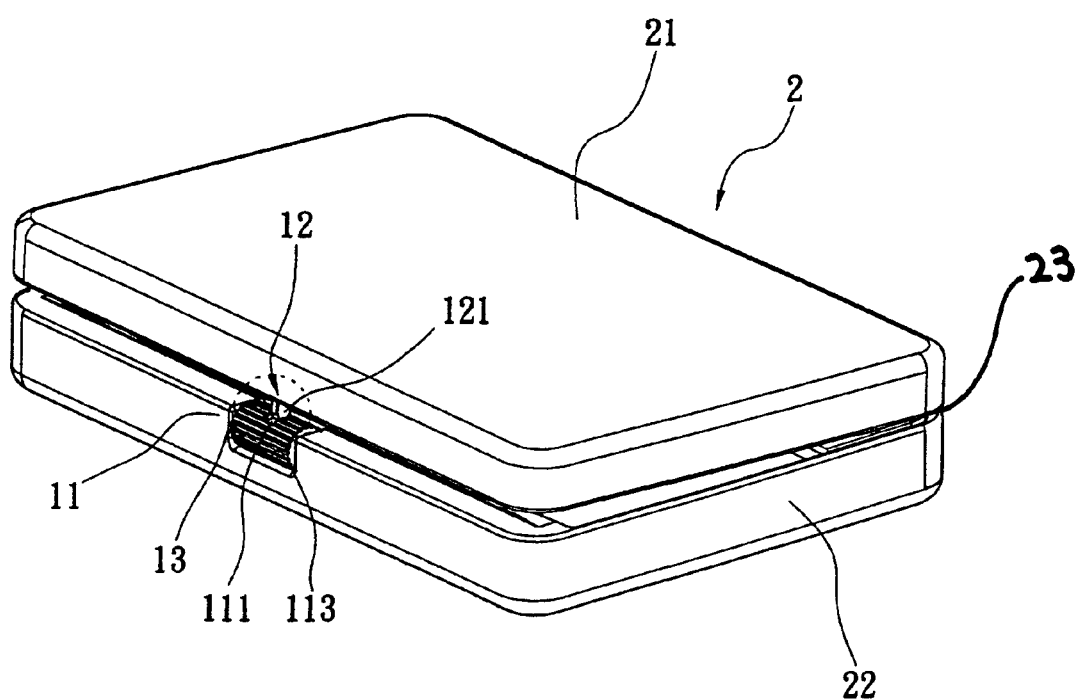
FIG. 3 is a perspective view of one embodiment of a locking device.
Figure 4:
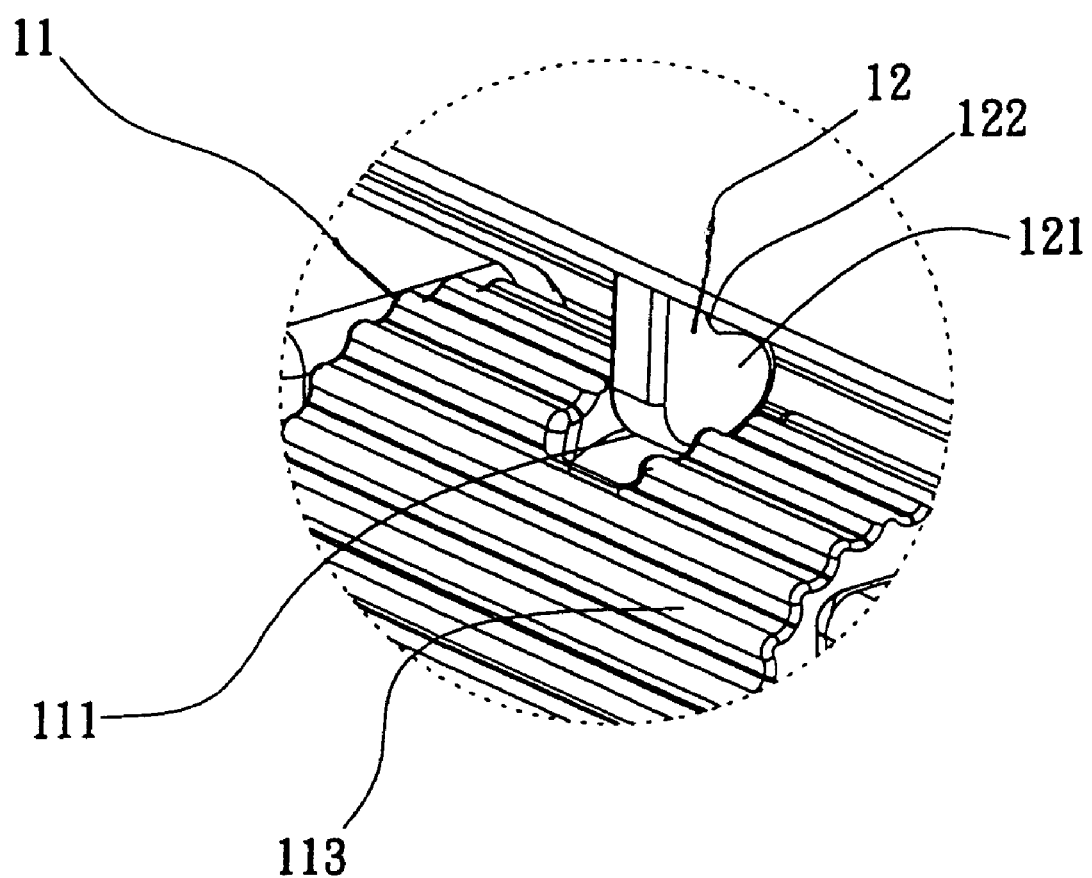
FIG. 4 is a perspective view of a locking device according to the present invention.

Referring to FIG. 3 and FIG. 4, a locking device 1 according to the present invention is applied in a casing 2 having a cover 21 and a seat 22 for the opening and closing of the casing. The seat has a first edge 23 pivotally hinged to the cover 21 and the second edge 24 in an opposite direction of the first hinging edge 23. The locking device 1 includes a roller 11, a buckle 12 and a recess 13. The recess 13 is formed on the second edge 24 of the seat 22, the buckle 12 protrudes downward from the cover 21 into the recess 13 when the cover 21 is closed against the seat 22. The roller 11 is parallel-disposed in the recess 13 and pivoted to the seat 22

Figure 5:
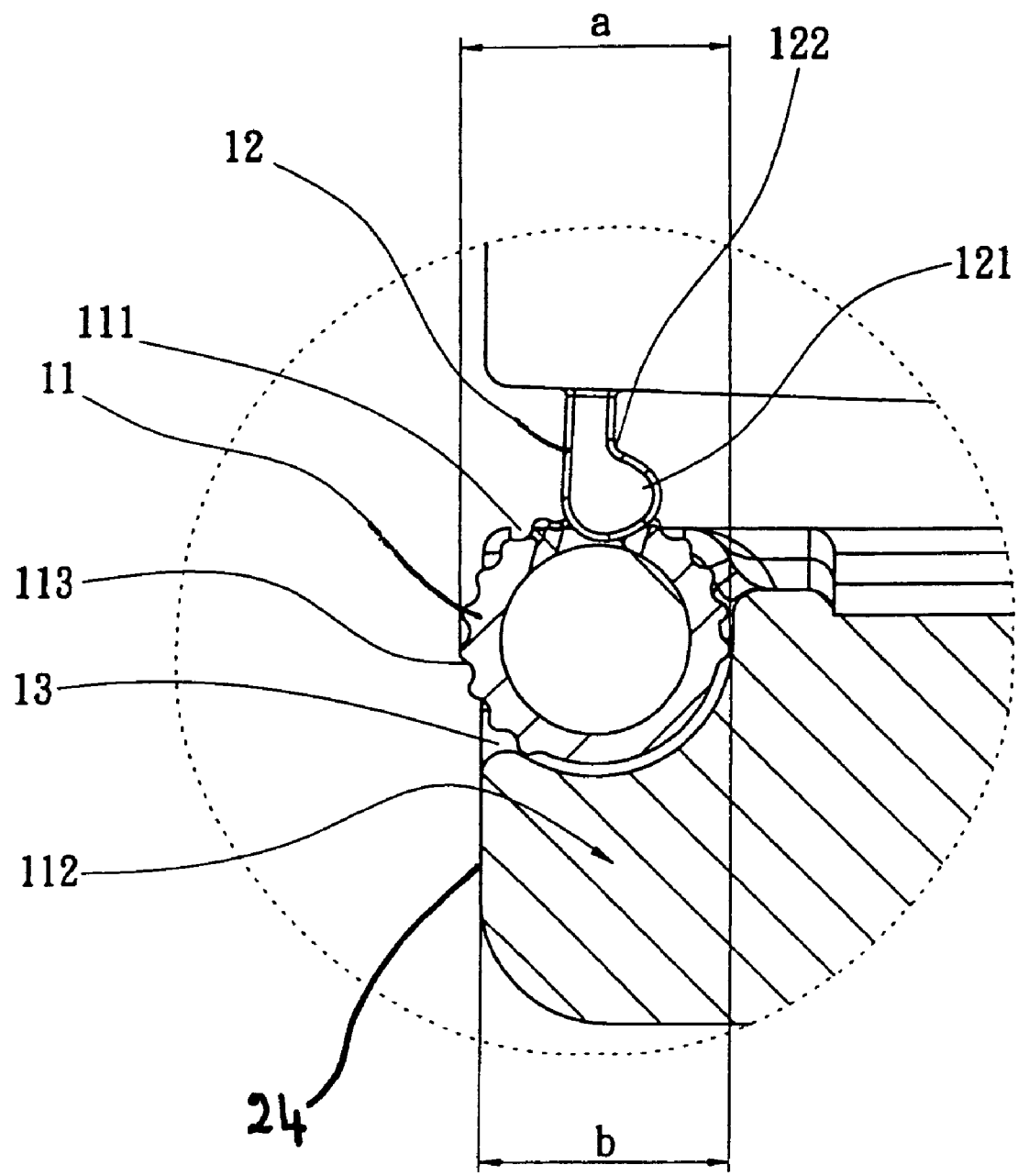
FIG. 5 is a side elevational view of the cross-section of a locking device according to the present invention.

Reference is made to FIG. 5, in which a diameter (a) of the roller 11 is larger than a depth (b) of the recess 13 so that the roller 11 partially protrudes out of the seat 22. The roller 11 has an upper slot 1ll relative to the buckle 12 and a pattern 113 formed on an outer surface thereof. When a user rotates the roller 11 upwards, the cover 21 can be lifted to open the casing 2.

Figure 6:
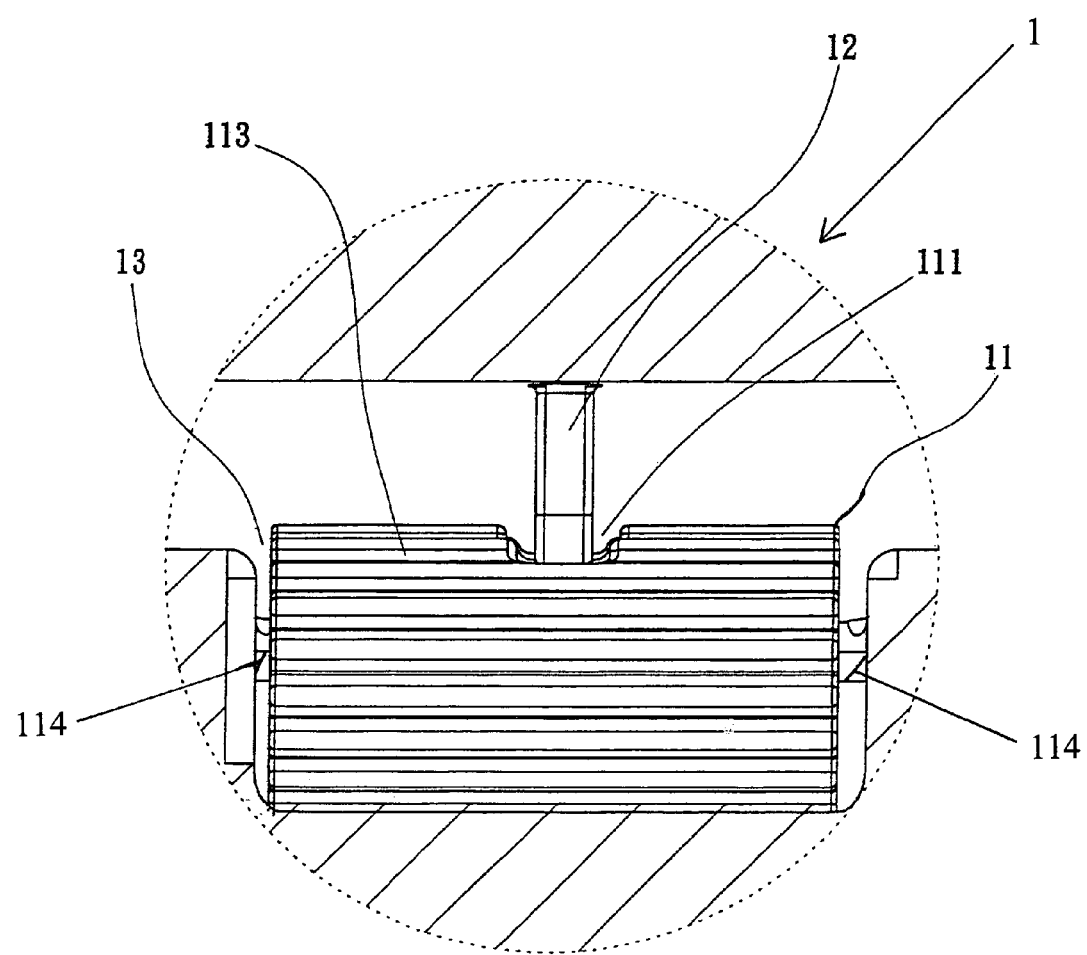
FIG. 6 is a perspective view illustrating buckling of the locking device of the present invention.
Figure 7:
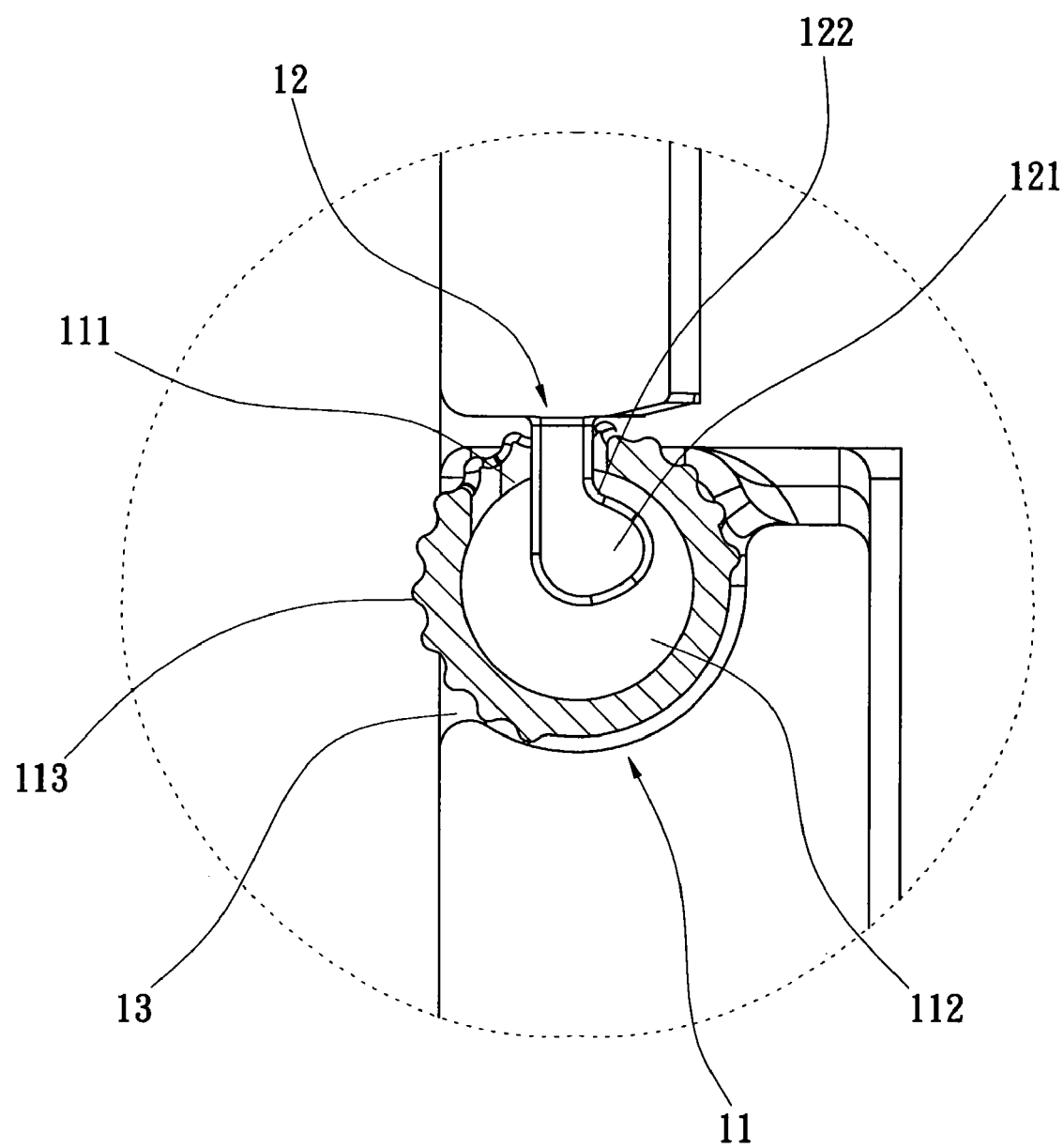
FIG. 7 is a side elevational view of the cross-section illustrating buckling a locking device according to the present invention.

Reference is made to FIG. 6 and FIG. 7, in which the buckle 12 has a projecting portion 121 at an end thereof and an arcuate face 122 on an inner side facing the hinging edge 23. To close the casing 2, the projecting portion 121 of the buckle 120 hooks the upper slot 111 when the cover 12 is rotated down. To open the casing 2, the arcuate face 122 of the buckle 120 is moved upward and smoothly against the upper slot 111 to slide out of the upper slot 111 when the cover 21 is lifted.

The roller 11 further includes an inner recess 112 to contain the projecting portion 121 of the buckle 120. The roller 11 further includes resilient elements 114 disposed on each side thereof for recovering the roller 11 to a predetermined position when the roller 11 is rotated to release the buckle 12.

Figure 8:
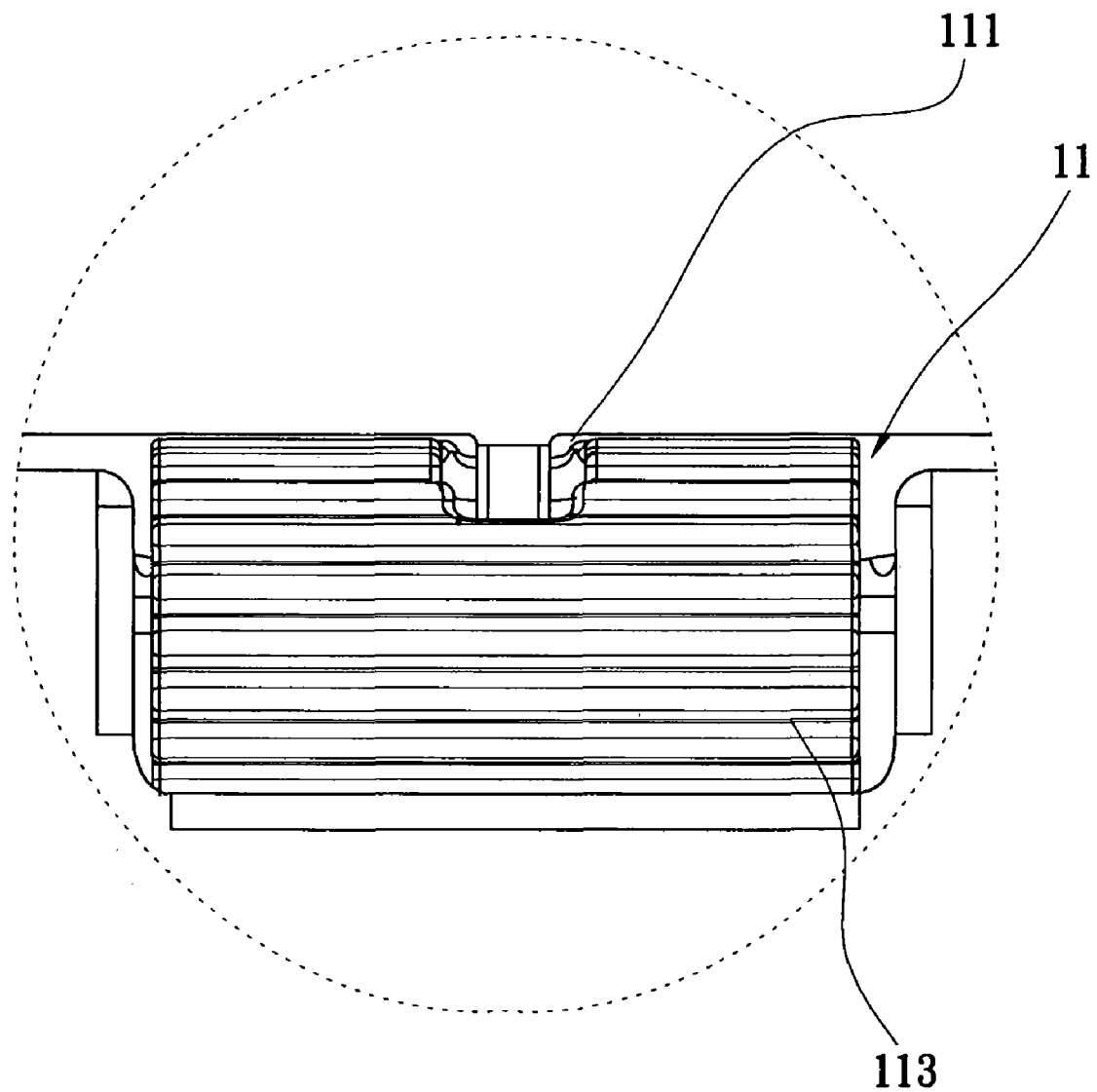
FIG. 8 is a perspective view of a first embodiment of the roller surface of the locking device according to the present invention.
Figure 9:
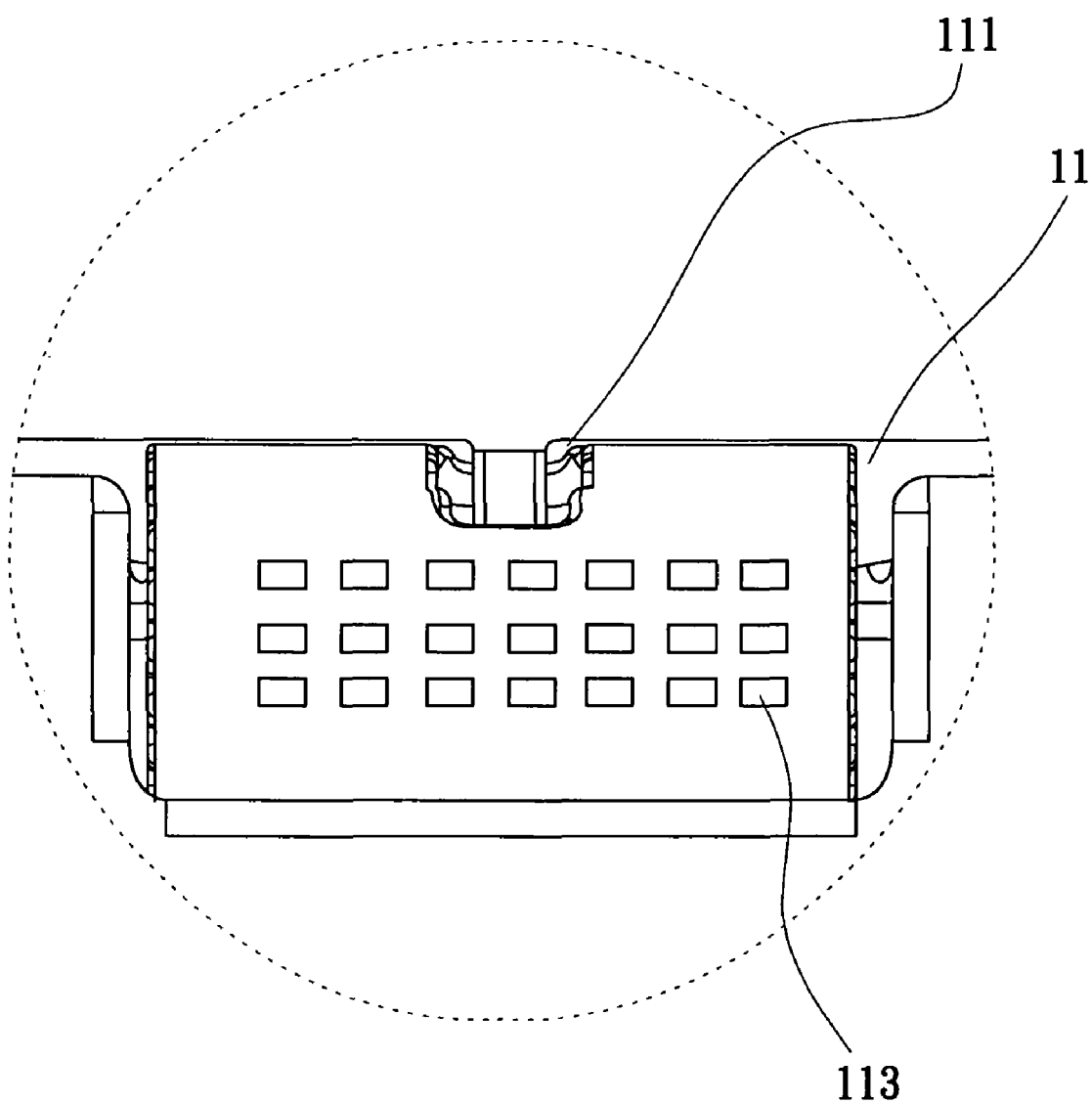
FIG. 9 is a perspective view of a second embodiment of the roller surface of the locking device according to the present invention.

Reference is made to FIG. 8 and FIG. 9, in which the pattern 113 is alternatively arranged to be rough and uneven on the outer surface and the pattern 113 includes parallel grooves and embossing arrayed with a predetermined distance therebetween and in an order.

The present invention utilizes the roller 11 rotated in a clockwise direction corresponding to an opening direction of the cover 21 to identify the direction operation and achieve an ergonomic product, and further utilizes simple components and assembly steps to reduce manufacturing costs.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A locking device on a casing, the casing having a cover and a seat, wherein the seat has a first edge pivotally engaged to the cover and a second edge which is free and parallel to the first edge, the locking device comprising:
    a recess having a length thereof formed on the second edge of the seat parallel to that of the second edge;
    a buckling member engaged on the cover extending downward from the cover and having a projecting portion at an end of the buckling member on an inner side of the buckling member facing the first edge;
    an arcuate face disposed on a top side of the projecting portion;
    a roller rotatably engaged in the recess with a length thereof parallel to that of said second edge;
    a resilient element engaged between the recess and the roller at opposite ends of the roller to maintain the roller in engagement with the buckling member when the casing is closed and to return the roller to an initial position after the roller has been rotated by a user;
    the roller further having an upper slot having a length thereof perpendicular to said second edge and a pattern arranged on the outer surface of the roller;
    the diameter (a) of the roller being larger than a depth (b) of the recess so as to expose a portion of the length of the roller beyond the second edge;
    wherein the buckling member is engaged in the upper slot when the cover is closed against the seat; and
    wherein when a user manually rotates the roller clockwise towards the first edge and lifts the cover off the seat, the arcuate face slides against the upper slot until the buckling member is disengaged from the roller.

2. The locking device of claim 1, wherein the roller further includes an inner recess therein for containing the projecting portion.

3. The locking device of claim 1, wherein the pattern is an alternate series of concaves and convexes on the outer surface.

4. The locking device of claim 1, wherein the pattern includes parallel grooves arranged thereon.

5. The locking device of claim 1, wherein the pattern includes embossing arrayed with a predetermined distance therebetween in an order.

* * * * *